(12) United States Patent
Silverman et al.

(10) Patent No.: US 11,317,626 B2
(45) Date of Patent: May 3, 2022

(54) FORCHLORFENURON MIXTURES AND USES THEREOF

(71) Applicant: Valent BioSciences LLC, Libertyville, IL (US)

(72) Inventors: Franklin Paul Silverman, Highland Park, IL (US); Robert Erwin Fritts, Jr., Clovis, CA (US); Derek D. Woolard, Zion, IL (US); Marci Ann Surpin, Highland Park, IL (US); Steve McArtney, Antioch, IL (US)

(73) Assignee: VALENT BIOSCIENCES LLC, Libertyville, IL (US)

( * ) Notice: Subject to any disclaimer, the term of this patent is extended or adjusted under 35 U.S.C. 154(b) by 48 days.

(21) Appl. No.: 16/282,549

(22) Filed: Feb. 22, 2019

(65) Prior Publication Data
US 2019/0261629 A1    Aug. 29, 2019

Related U.S. Application Data

(60) Provisional application No. 62/634,229, filed on Feb. 23, 2018.

(51) Int. Cl.
*A01N 43/40* (2006.01)
*C05C 1/00* (2006.01)
*A01N 47/36* (2006.01)

(52) U.S. Cl.
CPC ............ *A01N 43/40* (2013.01); *A01N 47/36* (2013.01); *C05C 1/00* (2013.01)

(58) Field of Classification Search
None
See application file for complete search history.

(56) References Cited

U.S. PATENT DOCUMENTS

| | | |
|---|---|---|
| 2010/0016165 A1 | 1/2010 | Wang et al. |
| 2016/0198714 A1 | 7/2016 | Stoller et al. |
| 2017/0325456 A1 | 11/2017 | Lovatt |

FOREIGN PATENT DOCUMENTS

| | | | |
|---|---|---|---|
| CN | 103265380 A | 8/2013 | |
| CN | 104844355 A | 8/2015 | |
| CN | 104860742 A | 8/2015 | |
| CN | 105330406 A | 2/2016 | |
| CN | 105432646 A * | 3/2016 | |
| CN | 105432662 A * | 3/2016 | |
| CN | 105766539 A | 7/2016 | |
| WO | WO-9724926 A1 * | 7/1997 | ............ A01N 59/06 |
| WO | 2010011800 A1 | 1/2010 | |
| WO | 2015038917 A1 | 3/2015 | |

OTHER PUBLICATIONS

Farm Progress (https://www.farmprogress.com/nitrogen-compounds-promote-even-grapevine-bud-break, 2003) (Year: 2003).*
AVMPA (https://apvma.gov.au/sites/default/files/publication/13791-prs-forchlorfenuron.pdf, 2005) (Year: 2005).*
Wolf et al. (http://s3.amazonaws.com/udextension/lawngarden/files/2012/10/CHAP5.pdf, Oct. 2012 (Year: 2012).*
McCauley (https://landresources.montana.edu/nm/documents/NM9.pdf, 2011) (Year: 2011).*
Flint, M. L. "Oils: important garden pesticides" 2014, https://ucanr.edu/blogs/blogcore/postdetail.cfm?postnum=13099, no pagination. (Year: 2014).*
Kumar, K. et al. "Antibiotic uptake by plants from soil fertilized with animal manure" Journal of Environmental Quality, 2005, 34, 2082-2085. (Year: 2005).*
USDA, "Petition for inclusion on the National List of a Substance to be used for organic crop production: SDS" (https://www.ams.usda.gov/sites/default/files/media/S%20Lauryl.pdf, no pagination, 78 pages total). (Year: 2004).*
International Search Report and Written Opinion dated Apr. 15, 2019.

* cited by examiner

*Primary Examiner* — Erin E Hirt
(74) *Attorney, Agent, or Firm* — Wood, Phillips, Katz, Clark & Mortimer

(57) ABSTRACT

The present invention relates to forchlorfenuron mixtures. The present invention further relates to methods of promoting or synchronizing bud break in woody perennial plants by applying forchlorfenuron mixtures of the present invention. The present invention further relates to methods of promoting plant growth in woody perennial plants by applying forchlorfenuron mixtures of the present invention.

2 Claims, No Drawings

FORCHLORFENURON MIXTURES AND USES THEREOF

FIELD OF THE INVENTION

The present invention relates to forchlorfenuron mixtures. The present invention further relates to methods of promoting or synchronizing bud break in woody perennial plants by applying forchlorfenuron mixtures of the present invention. The present invention further relates to methods of promoting growth in woody perennial plants by applying forchlorfenuron mixtures of the present invention.

BACKGROUND OF THE INVENTION

Woody perennial plants such as deciduous fruit trees and grape vines require chilling temperatures between growing seasons to properly bear an acceptable fruit yield. Specifically, the plants develop a resting bud at the conclusion of the growing season that is more likely to survive between growing seasons. This bud stage is known as dormancy. In order for dormancy to be broken and woody perennial plant growth to resume, a threshold amount of chilling is required. Effective chilling is based on both the duration of chilling and the temperature of the chilling period. This is normally followed by elevated temperatures that break dormancy and lead to synchronous flowering and fruit development. This breaking of dormancy in woody perennial plants is known as bud break.

The most commercially successful bud dormancy breaking chemical is hydrogen cyanamide ("HC"). HC is the active agent in Dormex® (Dormex is a registered trademark of and available from AlzChem AG, Germany). In addition to compensating for a lack of chilling, HC has been used to initiate earlier and more synchronous bud break leading to increased fruit set and fruit yields. However, HC is highly toxic and has been shown to result in adverse human health effects from contact with the skin and/or mucous membranes. See, Schep et al., The adverse effects of hydrogen cyanamide on human health: an evaluation of inquiries to the New Zealand National Poisons Centre. *Clin Toxicol (Phila).* 2009 47(1):58-60 and Update: hydrogen cyanamide-related illnesses—Italy, 2002-2004, *MMWR Morb Mortal Wkly Rep,* 2005 Apr. 29, 54(16), 405-408. Moreover, high rates of HC are associated with in-season phytotoxicity and long-term decline in vine health and yield.

Forchlorfenuron (N-(2-Chloro-4-pyridyl)-N'-phenylurea) is another chemical that has been used to regulate seed dormancy and fruit size. Forchlorfenuron has been reported to break dormancy of seeds. See, Emamipoor Y, et al., An efficient method in breaking of dormancy from *Bunium persicum* (Boiss) Fedtsch seeds: a valuable herb of Middle East and Central Asia. *Asian Pac J Trop Biomed.,* 2014 Aug. 4(8), 642-649. However, there is no published literature on forchlorfenuron breaking bud dormancy.

Nitrogen containing fertilizers are used to enhance growth in most human-cultivated plant species. Nitrogen containing fertilizers have also been shown to promote early bud break and bud break synchrony in apples, cherries and grapes. However, nitrogen containing fertilizers are not as effective or consistent as hydrogen cyanamide at breaking bud dormancy. See, Hawerroth F J, et al.: Erger and calcium nitrate concentration for budbreak induction in apple trees, *Acta Hort.,* 2010 August, 872(32), 239-244.

Accordingly, there is a need in the art for a composition that can break bud dormancy as well or better than hydrogen cyanamide, but without causing negative plant or animal health issues.

SUMMARY OF THE INVENTION

The present invention is directed to an agricultural composition for breaking bud dormancy comprising a mixture of an effective amount of forchlorfenuron and an effective amount of a nitrogen containing fertilizer wherein the amount of forchlorfenuron and the nitrogen containing fertilizer is at a ratio from about 1:0.3 to about 1:3,000.

The present invention is further directed to a method of promoting earlier bud break or synchronizing bud break and flowering in woody perennial plants by applying a composition comprising an effective amount of forchlorfenuron and an effective amount of a nitrogen containing fertilizer, wherein the amount of forchlorfenuron and the nitrogen containing fertilizer is at a ratio from about 1:0.3 to about 1:3,000.

The present invention is further directed to a method of promoting plant growth in woody perennial plants by applying a composition comprising an effective amount of forchlorfenuron and an effective amount of a nitrogen containing fertilizer, wherein the amount of forchlorfenuron and the nitrogen containing fertilizer is at a ratio from about 1:0.3 to about 1:3,000.

DETAILED DESCRIPTION OF THE INVENTION

Forchlorfenuron mixtures of the present invention were unexpectedly found to promote and synchronize bud break (i.e. initiation of growth) in woody perennial plants equal to or greater than the commercial bud break standard, Dormex®. Further, forchlorfenuron mixtures of the present invention were unexpectedly found to promote and synchronize bud break (i.e. initiation of growth) and promote plant growth in woody perennial plants at a rate greater than the sum of the effects of each active agent alone.

As used herein the phrase "breaking bud dormancy" or "bud break" refers to the initiation of growth from the bud following a period of dormancy.

As used herein the term "promoting" refers to earlier initiating or enhancing.

As used herein the term "forchlorfenuron" refers to the following chemical structure:

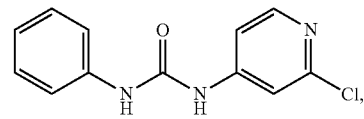 [SMILES: O=C(Nc1ccccc1)Nc1ccnc(Cl)c1]

having CAS number 68157-60-8. Forchlorfenuron is also known as N-(2-Chloro-4-pyridyl)-N'-phenylurea, CPPU, KT30 and 4PU30.

As used herein the term "nitrogen containing fertilizer" refers to a fertilizer that contains nitrogen.

As used herein the term "calcium ammonium nitrate fertilizer" refers to a fertilizer that contains calcium and nitrogen in the form of nitrate and ammonium.

"15-0-0 fertilizer" refers to a fertilizer containing about 15% nitrogen including Erger® (Erger is a registered trademark of Valagro S. P. A., Italy and is available from Helena Chemical Company, Collierville, Tenn., USA) and all formulations described in International PCT application publication WO/2001/037653A2 by Valagro S. P. A., Italy, which is incorporated, herein, in its entirety. Erger® was used in combination with Activ Erger® (Valagro S. P. A., Italy), which is an additional source of nitrogen.

As used herein the term "17-0-0 fertilizer" refers to a fertilizer containing about 17% nitrogen. CAN17® was used as the source of 17-0-0 fertilizer. CAN17 contains 17% total nitrogen as 4.6% ammonium nitrogen and 11.6% nitrate nitrogen and 1.3% urea nitrogen and 8.8% calcium derived from ammonium nitrate and calcium nitrate. CAN17 is available from J.R. Simplot Company (Boise, Id., USA).

As used herein the term "27-0-0 fertilizer" refers to a fertilizer containing about 27% nitrogen. YaraBela CAN 27 is one commercial source of 27-0-0 fertilizer. YaraBela CAN 27 contains 27% nitrogen as 13.5% nitrate and 13.5% ammoniacal, 4% calcium and 1% magnesium.

The present invention can be applied via spray, drench, drip, painting or rolling on with a brush, wiping on and chemigation techniques.

As used herein, all numerical values relating to amounts, ratios, weight percentages and the like are defined as "about" or "approximately" each particular value, plus or minus 10%. For example, the phrase "at least 5.0% by weight" is to be understood as "at least 4.5% to 5.5% by weight." Therefore, amounts within 10% of the claimed values are encompassed by the scope of the claims.

In one embodiment, the present invention is directed to an agricultural composition for breaking bud dormancy comprising a mixture of an effective amount of forchlorfenuron and an effective amount of a nitrogen containing fertilizer, wherein the amount of forchlorfenuron and the nitrogen containing fertilizer is at a ratio from about 1:0.3 to about 1:3,000.

In a preferred embodiment, the nitrogen containing fertilizer is a calcium ammonium nitrate fertilizer.

In a more preferred embodiment, the nitrogen containing fertilizer is selected from the group consisting of 15-0-0 fertilizer, 17-0-0 fertilizer and 27-0-0 fertilizer.

In another embodiment, the compositions of the present invention further comprise a surfactant. Surfactants suitable for use in the present invention include, but are not limited to, nonionic surfactants, anionic surfactants, silicone surfactants and mixtures thereof.

Nonionic surfactants include, but are not limited to, polysorbates such as polysorbate 20, polysorbate 40, polysorbate 60 and polysorbate 80, sorbitan derivatives such as Tween® 80, Tween® 85 (Tween® is a registered trademark of Croda Americas, Inc., Tween® 80 and 85 are available from Croda, Inc.), ethoxylated alcohols such as Brij® 98 (Brij® is a registered trademark of Uniqema Americas LLC, Brij® 98 is available from Croda Inc.), ethoxylated alkylphenols such as Igepol C A-630, Igepol, and Igepol CO-630 from Rhodia Inc., ethoxylated fatty acids such as Myrj® 52 (Myrj® is a registered trademark of Atlas Powder Company, Myrj® 52 is available from Croda Inc.), silicone based surfactants such as Silwet L-77® (Silwet and Silwet L-77 are registered trademarks of Momentive Performance Chemicals, Silwet L-77® is available from Momentive Performance Chemicals), and block polymeric surfactants such as Pluronic® P85 and Pluronic® P104 (Pluronic is a registered trademark of BASF Corporation, Pluronic® P85 and P104 are available from BASF Corporation) and mixtures thereof.

Anionic surfactants include, but are not limited to, water-soluble salts of higher fatty acid monoglyceride monosulfates, such as the sodium salt of the monosulfated monoglyceride of hydrogenated coconut oil fatty acids, higher alkyl sulfates, such as sodium lauryl sulfate, alkyl aryl sulfonates, such as sodium dodecyl benzene sulfonate, alkyl ethoxy sulfates, monoalkylphosphates, α-olefin sulphonates, higher fatty acid esters of 1,2-dihydroxypropane sulfonate, organic phosphates esters, such as mono- and di-alkylethoxyphosphates, and the substantially saturated higher aliphatic acyl amides of lower aliphatic amino carboxylic acid compounds, such as those having 12 to 16 carbons in the fatty acid, alkyl or acyl radicals, and mixtures thereof.

Silicone surfactants include, but are not limited to, disodium PEG-12 dimethicone sulfosuccinate (available from McIntyre Group, Ltd. under the tradename Mackanate DC-100), and PEG-12 dimethicone, PEG-10 dimethicone, PEG-8 dimethicone, PEG-7 dimethicone, PEG-7 dimethicone succinate (all available from SilTech, LLC), PEG-20/PPG-6 dimethicone, PEG-14/PPG-4 dimethicone, PEG-4/PPG-12 dimethicone, PEG-20/PPG-20 dimethicone (available from Evonik), dimethylsiloxane and methyl(polyoxyethylene) siloxane copolymers (available from Shin Etsu Silicones), dimethylsiloxane and methyl(polyoxyethylene) siloxane and methyl(polyoxypropyl) siloxane copolymers (available from Shin Etsu Silicones), SILSOFT (available from Momentus Performance Materials), including, for example, PEG-8 trisiloxane PEG-8/PPG-26 dimethicone, PEG-20/PPG-23 dimethicone, PEG-20/PPG-15 dimethicone, PEG-23/PPG-6 dimethicone, PEG-17 dimethicone and PPG-12 dimethicone and mixtures thereof.

In another embodiment, the present invention is directed to a method of promoting or synchronizing bud break and flowering in woody perennial plants, preferably grape vines, comprising applying a composition comprising an effective amount of forchlorfenuron and an effective amount of a nitrogen containing fertilizer, wherein the amount of forchlorfenuron and the nitrogen containing fertilizer is at a ratio from about 1:0.3 to about 1:3,000.

In another embodiment, the present invention is directed to a method of promoting plant growth in woody perennial plants, preferably grape vines, comprising applying a composition comprising an effective amount of forchlorfenuron and an effective amount of a nitrogen containing fertilizer, wherein the amount of forchlorfenuron and the nitrogen containing fertilizer is at a ratio from about 1:0.3 to about 1:3,000.

In methods of the present invention, forchlorfenuron and the nitrogen containing fertilizer may be applied sequentially or concurrently.

In a preferred embodiment, the present invention is directed to an agricultural composition for breaking bud dormancy comprising forchlorfenuron and 15-0-0 fertilizer at a ratio from about 1:100 to about 1:3,000, more preferably from about 1:500 to about 1:1,500 and even more preferably at about 1:797.

In another preferred embodiment, the present invention is directed to an agricultural composition for breaking bud dormancy comprising forchlorfenuron and 17-0-0 fertilizer at a ratio from about 1:100 to about 1:1,000, more preferably from about 1:400 to about 1:700 and even more preferably at about 1:657.

Woody perennial plants refer to plants with stems that do not die back to the ground from which they grew and include, but are not limited to, grape vines, kiwifruit vines, stone fruit trees including but not limited to peach trees, nectarine trees, apricot trees, and cherry trees, apple trees, pear trees, blueberry bushes, brambles including raspberry and blackberry.

These representative embodiments are in no way limiting and are described solely to illustrate some aspects of the invention.

nitrate. CAN-17 is available from J. R. Simplot Company (Boise, Id., USA). In the following examples, 17-0-0 fertilizer was applied at a rate of 118,200 ppm calcium nitrate and 78,900 ppm nitrogen nitrate or 197,100 ppm total. See, Table 1 below, for ratios of forchlorfenuron ("CPPU") to fertilizer that were used in the following examples.

TABLE 1

| CPPU mg/L | 17-0-0 Fertilizer | | | | | Ratio | | | |
|---|---|---|---|---|---|---|---|---|---|
| | % (v/v) | N mg/L | Ca mg/L | $NH_3N_2$ (mg/L) | Nitrate $N_2$ (mg/L) | N:CPPU | Ca:CPPU | $NH_3N_2$:CPPU | Nitrate $N_2$:CPPU |
| 100 | 0 | 0 | 0 | 0 | 0 | | | | |
| 100 | 10 | 17000 | 8800 | 5400 | 11600 | 170 | 88 | 54 | 116 |
| 100 | 30 | 51000 | 26400 | 16200 | 34800 | 510 | 264 | 162 | 348 |
| 300 | 0 | 0 | 0 | 0 | 0 | | | | |
| 300 | 3 | 5100 | 2640 | 1620 | 3480 | 17 | 8.8 | 5.4 | 11.6 |
| 300 | 10 | 17000 | 8800 | 5400 | 11600 | 56.7 | 29.3 | 18 | 38.7 |
| 300 | 30 | 51000 | 26400 | 16200 | 34800 | 170 | 88 | 54 | 116 |
| 600 | 0 | 0 | 0 | 0 | 0 | | | | |
| 600 | 10 | 17000 | 8800 | 5400 | 11600 | 28.3 | 14.67 | 9 | 19.33 |
| 600 | 30 | 51000 | 26400 | 16200 | 34800 | 85 | 44 | 27 | 58 |
| 1000 | 0 | 0 | 0 | 0 | 0 | | | | |
| 1000 | 3 | 5100 | 2640 | 1620 | 3480 | 5.1 | 2.64 | 1.62 | 3.48 |
| 1000 | 10 | 17000 | 8800 | 5400 | 11600 | 17.0 | 8.8 | 5.4 | 11.6 |
| 1000 | 30 | 51000 | 26400 | 16200 | 34800 | 51 | 26.4 | 16.2 | 34.8 |

| CPPU mg/L | 15-0-0 Fertilizer (Erger + 20% (w/v) $Ca(NO_3)_2$) | | | Ratio | |
|---|---|---|---|---|---|
| | % (v/v) | N mg/L | Ca mg/L | N:CPPU | Ca:CPPU |
| 0 | 3 | 16600 | 16340 | | |
| 600 | 3 | 16600 | 16340 | 27.7 | 27.2 |
| 1000 | 3 | 16600 | 16340 | 16.6 | 16.3 |
| 0 | 6 | 33200 | 32680 | | |
| 300 | 6 | 33200 | 32680 | 110.7 | 108.9 |
| 600 | 6 | 33200 | 32680 | 55.3 | 54.5 |
| 1000 | 6 | 33200 | 32680 | 33.2 | 32.7 |
| 0 | 10 | 55333 | 54467 | | |
| 300 | 10 | 55333 | 54467 | 184.4 | 181.6 |
| 600 | 10 | 55333 | 54467 | 92.2 | 90.8 |
| 1000 | 10 | 55333 | 54467 | 55.3 | 54.5 |

The following example is offered by way of illustration only and not by way of limitation.

EXAMPLES

Example 1—Efficacy Forchlorfenuron Mixtures on Concord Grape Vines

An aqueous 50% hydrogen cyanamide solution (Sigma-Aldrich, St. Louis, Mo. USA) was used as the source of hydrogen cyanamide ("HC"). The commercial product, Dormex® contains 50% hydrogen cyanamide (w/v) in an aqueous base.

Erger® was used as the source of 15-0-0 fertilizer. Erger® contains 15% total nitrogen as 3.1% ammoniacal nitrogen, 5.8% nitrate nitrogen, 6.1% urea nitrogen and 3.3% calcium derived from a mixture of ammonium nitrate, calcium nitrate and urea. Erger® is always used in combination with either 20% (w/v) $Ca(NO_3)_2$ or Activ Erger®. In the following examples, 15-0-0 fertilizer was applied at a rate of 208,340 ppm calcium nitrate, 15,060 ppm nitrogen nitrate and 15,660 ppm urea or 239,060 ppm total.

CAN-17 was used as the 17-0-0 fertilizer. CAN-17 contains 17% total nitrogen as 4.6% ammonium nitrogen and 11.6% nitrate nitrogen and 1.3% urea nitrogen and 8.8% calcium derived from ammonium nitrate and calcium Method To assess the ability of mixtures of the invention to promote and synchronize bud break these mixtures were applied to Concord grape vines and examined for bud break (initiation of growth) and subsequent shoot development. Specifically, dormant bare-rooted Concord grape vines were planted in pots containing Pro-Mix® BX potting soil (Pro-Mix is a registered trademark of and available from Premier Horticulture Ltd.) and pruned to five nodes on a single shoot of one-year-old wood. Nodes are regions on the shoot where leaves arise from the shoot and buds are present at the axis of the shoot:leaf interface. The bud found at the shoot:leaf interface develops into the vines new shoot growth. Aqueous solutions of forchlorfenuron, HC, 15-0-0 fertilizer, 17-0-0 fertilizer, and mixtures thereof were each applied individually or sequentially or co-applied to the first-year wood of separate Concord grape vines. Plants were grown in a heated greenhouse for 49 days and evaluated for percent of vines showing bud break, periodically between seven days after application and the conclusion of the experiment. Percent bud break is determined by the number of plants that have at least one bud broken divided by the total number of plants per treatment times 100. At 51 days after treatment ("DAT"), the plants were sacrificed and measured for total number of flower clusters, total new shoot length, longest new shoot, combined new shoot fresh weight. New shoot growth is the growth arising from the dormant buds not including the woody growth that was planted and gave rise to the new growth.

To determine if the mixtures provided unexpected results, the observed combined efficacy ("OCE") was divided by the expected combined efficacy ("ECE") wherein the expected ECE is calculated by the Abbott method:

ECE=A+B−(AB/100), wherein ECE is the expected combined efficacy and in which A and B are the speed of bud break relative to control, the number of buds broken per plant relative to control, shoot length relative to control or shoot weight relative to control given by the single active ingredients. If the ratio between the OCE of the mixture and the ECE of the mixture is greater than 1, then greater than expected interactions are present in the mixture. (Gisi, Synergistic Interaction of Fungicides in Mixtures, The American Phytopathological Society, 86:11, 1273-1279,1996).

Results

TABLE 2

Percentage of Concord Grape Vines with Dormancy Relieved

| Days After Treatment | 31 | 34 | 36 | 38 | 43 | 45 | 51 |
|---|---|---|---|---|---|---|---|
| Control | 25 | 37.5 | 37.5 | 50 | 50 | 50 | 62.5 |
| 1% HC (v/v) | 100 | 100 | 100 | 100 | 100 | 100 | 100 |
| CPPU 100 ppm | 25 | 50 | 50 | 50 | 75 | 75 | 87.5 |
| CPPU 300 ppm | 12.5 | 37.5 | 50 | 50 | 62.5 | 62.5 | 62.5 |
| CPPU 1000 ppm | 37.5 | 62.5 | 62.5 | 75 | 87.5 | 87.5 | 87.5 |
| CAN17 30% (v/v) | 87.5 | 87.5 | 87.5 | 100 | 100 | 100 | 100 |
| Erger ® 6% + 20% (w/v) Ca(NO₃)₂ | 37.5 | 37.5 | 75 | 75 | 100 | 100 | 100 |
| CPPU 300 ppm + CAN17 30% | 75 | 87.5 | 87.5 | 87.5 | 87.5 | 87.5 | 100 |
| CPPU 300 ppm + Erger ® 6% + 20% (w/v) Ca(NO₃)₂ | 87.5 | 87.5 | 87.5 | 87.5 | 87.5 | 87.5 | 100 |

% is based on number of plants with at least one bud showing a green shoot emerging
"ppm" denotes parts per million
v/v denotes volume/volume Another way of describing the effects of dormancy breaking treatments on bud break is to examine the number of days from application to 50% of the plants showing at least one bud broken ("50% BB") or the number of days from bud break on the first plant to the time 50% of the plants exhibit bud break on at least one bud in a given treatment ("0-50% BB"), a measure of plant to plant bud break synchrony.

TABLE 3

Bud Break Synchrony

| | 50% BB | 0-50% BB | 50% BB ECE | 0-50% BB ECE | 50% BB OCE | 0-50% BB OCE | 50% BB OCE:ECE | 0-50% BB OCE:ECE |
|---|---|---|---|---|---|---|---|---|
| Control | 38 | 14 | — | — | — | — | — | — |
| 1% HC (v/v) | 15 | 4 | — | — | — | — | — | — |
| CPPU 100 ppm | 34 | 10 | — | — | — | — | — | — |
| CPPU 300 ppm | 36 | 7 | — | — | — | — | — | — |
| CPPU 1000 ppm | 34 | 14 | — | — | — | — | — | — |
| CAN17 30% (v/v) | 27 | 14 | — | — | — | — | — | — |
| Erger ® 6% + 20% (w/v) Ca(NO₃)₂ | 36 | 19 | — | — | — | — | — | — |
| CPPU 300 ppm + CAN17 30% | 20 | 5 | 13 | 7 | 18 | 9 | 1.4 | 1.3 |
| CPPU 300 ppm + Erger ® 6% + 20% (w/v) Ca(NO₃)₂ | 27 | 10 | 4 | 2 | 11 | 4 | 2.8 | 1.7 | ppm = parts per million (milligrams per liter)

As seen in Table 2, above, application of 1% HC was the standard for bud breaking, causing Concord grape vines to reach 50% bud break by 15 days after treatment ("DAT"). No other compound that was tested caused earlier bud break. However, the combination of 300 ppm forchlorfenuron with 17-0-0 fertilizer or 15-0-0 fertilizer caused the plants to reach 50% bud break in 20 and 27 days, respectively. Control plants took 38 days to reach 50% bud break. This data demonstrates that mixtures of 300 ppm forchlorfenuron and particular nitrogen containing fertilizers work almost as well as the industry leading HC, and superior to the control at causing bud break.

Also seen in Table 2, application of 1% HC to Concord grape vines caused the plants to reach 50% bud break within four days after initial bud break. This measurement is a function of the synchrony of bud break. Specifically, the shorter the period between initial and 50% bud break, the more synchronous the bud break. Bud break synchrony is a highly desirable trait in commercial practice. Co-application of 300 ppm forchlorfenuron with 17-0-0 fertilizer resulted in five days between initial and 50% bud break. Control plants took 14 days between initial and 50% bud break.

The mixtures of forchlorfenuron, 15-0-0 and 17-0-0 fertilizers provided unexpected combined efficacy for several parameters. Both mixtures resulted in earlier than expected bud break, with OCE:ECE ratios of 1.4 and 2.8 for forchlorfenuron and 17-0-0 fertilizer and forchlorfenuron and 15-0-0 fertilizer, respectively. Both mixtures also resulted in greater than expected bud break synchrony with OCE:ECE ratios of 1.3 and 1.7 for forchlorfenuron and 17-0-0 fertilizer and forchlorfenuron and 15-0-0 fertilizer, respectively. Thus, application of mixtures of the present invention lead to unexpected promotion of dormancy breaking that are similar to commercial applications.

TABLE 4

Concord Grape Vine Measurements at 51 Days Post-Treatment

|  | FW/Plant | Broken Buds/Plant | FW/Broken Bud |
|---|---|---|---|
| Control | 4.88 | 1.80 | 2.71 |
| 1% HC | 27.95 | 2.50 | 11.18 |
| CPPU 100 ppm | 8.11 | 1.71 | 4.73 |
| CPPU 300 ppm | 9.39 | 2.00 | 4.69 |
| CPPU 1000 ppm | 12.22 | 1.29 | 9.51 |
| CAN17 30% (v/v) | 19.59 | 1.25 | 15.67 |
| Erger ® 6% + 20% (w/v) Ca(NO$_3$)$_2$ | 10.73 | 1.38 | 7.81 |
| CPPU 300 ppm + CAN17 30% (v/v) | 21.27 | 1.75 | 12.15 |
| CPPU 300 ppm + Erger ® 6% + 20% (w/v) Ca(NO$_3$)$_2$ | 15.38 | 1.88 | 8.20 |

"FW" denotes the combined shoot fresh weight at 51 DAT in grams
ppm = parts per million (milligrams/liter)

At harvest, fresh weight, and the number of buds broken per plant was assessed. The fresh weight of the new growth was least in the control and greatest in the HC treatment; a reflection of the earliness of the bud break in the HC-treated plants. Treatment with both 15-0-0 and 17-0-0 fertilizers resulted in significant increases in μW as compared to the control. In terms of FW, both of the combination treatments were greater than their respective component treatments.

Example 2—Forchlorfenuron Mixtures Efficacy on Concord Grape Vines

The experiment from Example 1 was repeated with varying quantities of forchlorfenuron and fertilizers in a greenhouse experiment. Results from this experiment can be seen in Tables 5-10, below.

TABLE 5

Bud Break Synchrony Forchlorfenuron and CAN17

|  | 50% BB | 50% BB ECE | 50% BB OCE | 50% BB OCE:ECE |
|---|---|---|---|---|
| Control | 35 | — | — | — |
| 1% HC (v/v) | 17 | — | — | — |
| CPPU 300 ppm | 31 | — | — | — |
| CPPU 600 ppm | 35 | — | — | — |
| CPPU 1000 ppm | 38 | — | — | — |
| CAN17 3% (v/v) | 35 | — | — | — |
| CAN17 10% (v/v) | 38 | — | — | — |
| CAN17 30% (v/v) | 21 | — | — | — |
| CPPU 300 ppm + CAN17 10% | 31 | 1 | 4 | 4.0 |
| CPPU 300 ppm + CAN17 30% | 14 | 17 | 21 | 1.2 |
| CPPU 600 ppm + CAN17 3% | 31 | 0 | 4 | 4.0* |
| CPPU 600 ppm + CAN17 10% | 31 | −3 | 4 | 3.3* |
| CPPU 600 ppm + CAN17 30% | 17 | 14 | 18 | 1.3 |
| CPPU 1000 ppm + CAN17 3% | 24 | −3 | 11 | 5.7* |
| CPPU 1000 ppm + CAN17 10% | 35 | −6 | 0 | 2.0* |
| CPPU 1000 ppm + CAN17 30% | 31 | 11 | 4 | 0.4 |

*To calculate synergy negative expected values were normalized to positive values and the corresponding observed values were increased linearly.

TABLE 6

Bud Break Synchrony Forchlorfenuron and Erger ®

|  | 50% BB | 50% BB ECE | 50% BB OCE | 50% BB OCE:ECE |
|---|---|---|---|---|
| Control | 28 | — | — | — |
| 1% HC (v/v) | 17 | — | — | — |
| CPPU 300 ppm | 26 | — | — | — |
| CPPU 600 ppm | 31 | — | — | — |
| CPPU 1000 ppm | 24 | — | — | — |
| Erger ® 3% + 20% (w/v) Ca(NO$_3$)$_2$ | 26 | — | — | — |
| Erger ® 6% + 20% (w/v) Ca(NO$_3$)$_2$ | 24 | — | — | — |
| Erger ® 10% + 20% (w/v) Ca(NO$_3$)$_2$ | 26 | — | — | — |
| CPPU 300 ppm + Erger ® 6% + 20% (w/v) Ca(NO$_3$)$_2$ | 28 | 6 | 0 | 0 |
| CPPU 300 ppm + Erger ® 10% + 20% (w/v) Ca(NO$_3$)$_2$ | 17 | 4 | 11 | 2.8 |
| CPPU 600 ppm + Erger ® 3% + 20% (w/v) Ca(NO$_3$)$_2$ | 24 | −1 | 4 | 6.0 |
| CPPU 600 ppm + Erger ® 10% + 20% (w/v) Ca(NO$_3$)$_2$ | 17 | 1 | 11 | 11.0 |
| CPPU 600 ppm + Erger ® 30% + 20% (w/v) Ca(NO$_3$)$_2$ | 17 | −1 | 11 | 13.0* |
| CPPU 1000 ppm + Erger ® 3% + 20% (w/v) Ca(NO$_3$)$_2$ | 24 | 6 | 4 | 0.7 |
| CPPU 1000 ppm + Erger ® 10% + 20% (w/v) Ca(NO$_3$)$_2$ | 17 | 8 | 11 | 1.4 |
| CPPU 1000 ppm + Erger ® 30% + 20% (w/v) Ca(NO$_3$)$_2$ | 21 | 6 | 7 | 1.2 |

*To calculate synergy negative expected values were normalized to positive values and the corresponding observed values were increased linearly.

As seen in Tables 5 and 6, above, application of 1% HC was the standard for bud breaking, causing Concord grape vines to reach 50% bud break by 17 DAT. However, the combination of 300 ppm forchlorfenuron and 30% 17-0-0 fertilizer caused earlier bud break at 14 DAT. Further, the combination of 600 ppm forchlorfenuron and 30% 17-0-0 fertilizer, 10% 15-0-0 fertilizer or 30% 15-0-0 fertilizer and 300 ppm forchlorfenuron and 10% 15-0-0 fertilizer and 1000 ppm forchlorfenuron and 10% 15-0-0 fertilizer caused the plants to reach 50% bud break in 17 DAT. Control plants took 35 and 28 days to reach 50% bud break in each of the experiments. This data demonstrates that mixtures of forchlorfenuron and particular nitrogen containing fertilizers work better and as well as the industry leading HC at causing bud break.

The mixtures of forchlorfenuron, 15-0-0 and 17-0-0 fertilizers provided unexpected combined efficacy for several parameters. Both mixtures resulted in earlier than expected bud break, with OCE:ECE ratios greater than 1 for 13 out of 16 combinations. Thus, application of mixtures of the present invention lead to unexpected promotion of dormancy breaking that are similar to or better than commercial applications.

TABLE 7

Average Number of Broken Nodes Per Plant at Harvest for Forchlorfenuron and 17-0-0 Fertilizer

|  |  | ECE | OCE | OCE:ECE |
|---|---|---|---|---|
| Control | 1.57 | — | — | — |
| 1% HC (v/v) | 2.38 | — | — | — |
| CPPU 300 ppm | 1.86 | — | — | — |
| CPPU 600 ppm | 2.00 | — | — | — |
| CPPU 1000 ppm | 1.80 | — | — | — |
| CAN17 3% (v/v) | 1.25 | — | — | — |
| CAN17 10% (v/v) | 1.50 | — | — | — |
| CAN17 30% (v/v) | 1.88 | — | — | — |
| CPPU 300 ppm + CAN17 10% | 1.75 | 0.214 | 0.179 | 0.8 |
| CPPU 300 ppm + CAN17 30% | 1.75 | 0.588 | 0.179 | 0.3 |
| CPPU 600 ppm + CAN17 3% | 2.25 | 0.109 | 0.679 | 6.3 |
| CPPU 600 ppm + CAN17 10% | 2.13 | 0.357 | 0.554 | 1.6 |
| CPPU 600 ppm + CAN17 30% | 3.38 | 0.731 | 1.804 | 2.5 |
| CPPU 1000 ppm + CAN17 3% | 2.25 | −0.092 | 0.679 | 9.3 |
| CPPU 1000 ppm + CAN17 10% | 2.38 | 0.157 | 0.804 | 5.1 |
| CPPU 1000 ppm + CAN17 30% | 2.38 | 0.531 | 0.804 | 1.5 |

* To calculate synergy negative expected values were normalized to positive values and the corresponding observed values were increased linearly.

TABLE 8

Average Number of Broken Nodes Per Plant at Harvest for Forchlorfenuron and 15-0-0 Fertilizer

|  |  | ECE | OCE | OCE:ECE |
|---|---|---|---|---|
| Control | 1.88 | — | — | — |
| 1% HC (v/v) | 2.13 | — | — | — |
| CPPU 300 ppm | 1.25 | — | — | — |
| CPPU 600 ppm | 1.88 | — | — | — |
| CPPU 1000 ppm | 2.63 | — | — | — |
| Erger ® 3% + 20% (w/v) Ca(NO$_3$)$_2$ | 1.63 | — | — | — |
| Erger ® 6% + 20% (w/v) Ca(NO$_3$)$_2$ | 1.75 | — | — | — |
| Erger ® 10% + 20% (w/v) Ca(NO$_3$)$_2$ | 1.88 | — | — | — |
| CPPU 300 ppm + Erger ® 6% + 20% (w/v) Ca(NO$_3$)$_2$ | 2.63 | −0.751 | 0.75 | 3.0* |
| CPPU 300 ppm + Erger ® 10% + 20% (w/v) Ca(NO$_3$)$_2$ | 3.25 | −0.625 | 1.38 | 4.2* |
| CPPU 600 ppm + Erger ® 3% + 20% (w/v) Ca(NO$_3$)$_2$ | 1.88 | −0.250 | 0.00 | 2.0* |
| CPPU 600 ppm + Erger ® 10% + 20% (w/v) Ca(NO$_3$)$_2$ | 3.00 | −0.125 | 1.13 | 11.0* |
| CPPU 600 ppm + Erger ® 30% + 20% (w/v) Ca(NO$_3$)$_2$ | 3.50 | 0.000 | 1.63 | 0.9# |
| CPPU 1000 ppm + Erger ® 3% + 20% (w/v) Ca(NO$_3$)$_2$ | 3.75 | 0.502 | 1.88 | 3.7 |
| CPPU 1000 ppm + Erger ® 10% + 20% (w/v) Ca(NO$_3$)$_2$ | 4.25 | 0.626 | 2.38 | 3.8 |
| CPPU 1000 ppm + Erger ® 30% + 20% (w/v) Ca(NO$_3$)$_2$ | 3.50 | 0.750 | 1.63 | 2.2 |

*To calculate synergy negative expected values were normalized to positive values and the corresponding observed values were increased linearly.
To calculate synergy for zero expected values the raw data was used to calculate synergy rather than the control relative data.

At harvest (52 days after planting), the number of nodes broken per plant was assessed. As can be seen in Tables 7 and 8, above, application of 1% HC was the standard for bud breaking, causing Concord grape vines to average 2.38 broken nodes per plant in the 17-0-0 fertilizer study and 2.13 broken nodes per plant in the 15-0-0 fertilizer study. However, the combination of 600 ppm forchlorfenuron and 30% 17-0-0 fertilizer, 300 ppm forchlorfenuron and 6% or 10% 15-0-0 fertilizer and 600 or 1000 ppm forchlorfenuron and 3%, 6% or 10% 15-0-0 fertilizer caused a greater number of broken nodes per plant than 1% HC. Further, the combination of 1000 ppm forchlorfenuron and 10% or 30% 17-0-0 fertilizer caused as many broken nodes per plant as 1% HC. Control plants had 1.57 and 1.88 broken nodes per plant in each of the experiments. This data demonstrates that mixtures of forchlorfenuron and particular nitrogen containing fertilizers work better and as well as the industry leading HC at causing bud break.

The mixtures of forchlorfenuron, 15-0-0 and 17-0-0 fertilizers provided unexpected combined efficacy for several parameters. Both mixtures resulted in greater than expected broken nodes per plant, with OCE:ECE ratios greater than 1 for 13 out of 16 combinations. Thus, application of mixtures of the present invention lead to unexpected promotion of dormancy breaking that are similar to or better than commercial applications.

TABLE 9

Fresh Weight at Harvest for Forchlorfenuron and 17-0-0 Fertilizer

|  |  | ECE | OCE | OCE:ECE |
|---|---|---|---|---|
| Control | 15.34 | — | — | — |
| 1% HC (v/v) | 37.01 | — | — | — |
| CPPU 300 ppm | 14.30 | — | — | — |
| CPPU 600 ppm | 15.10 | — | — | — |
| CPPU 1000 ppm | 11.33 | — | — | — |
| CAN17 3% (v/v) | 14.54 | — | — | — |
| CAN17 10% (v/v) | 12.74 | — | — | — |
| CAN17 30% (v/v) | 24.38 | — | — | — |
| CPPU 300 ppm + CAN17 10% | 19.00 | −3.664 | 3.663 | 3.0* |
| CPPU 300 ppm + CAN17 30% | 29.55 | 8.094 | 14.213 | 1.8 |
| CPPU 600 ppm + CAN17 3% | 15.29 | −1.039 | −0.050 | 2.0* |
| CPPU 600 ppm + CAN17 10% | 15.87 | −2.844 | 0.534 | 2.2* |
| CPPU 600 ppm + CAN17 30% | 33.68 | 8.821 | 18.338 | 2.1 |
| CPPU 1000 ppm + CAN17 3% | 20.23 | −4.841 | 4.888 | 3.0* |
| CPPU 1000 ppm + CAN17 10% | 14.15 | −6.713 | −1.188 | 1.8* |
| CPPU 1000 ppm + CAN17 30% | 20.13 | 5.391 | 4.788 | 0.9 |

*To calculate synergy negative expected values were normalized to positive values and the corresponding observed values were increased linearly.

TABLE 10

Fresh Weight at Harvest for Forchlorfenuron and 15-0-0 Fertilizer

|  |  | ECE | OCE | OCE:ECE |
|---|---|---|---|---|
| Control | 21.64 | — | — | — |
| 1% HC (v/v) | 42.21 | — | — | — |
| CPPU 300 ppm | 18.04 | — | — | — |
| CPPU 600 ppm | 18.54 | — | — | — |
| CPPU 1000 ppm | 29.13 | — | — | — |
| Erger ® 3% + 20% (w/v) Ca(NO$_3$)$_2$ | 24.13 | — | — | — |

TABLE 10-continued

Fresh Weight at Harvest for Forchlorfenuron and 15-0-0 Fertilizer

|  | ECE | OCE | OCE:ECE |
|---|---|---|---|
| Erger ® 6% + 20% (w/v) Ca(NO$_3$)$_2$ | 28.75 | — | — | — |
| Erger ® 10% + 20% (w/v) Ca(NO$_3$)$_2$ | 26.54 | — | — | — |
| CPPU 300 ppm + Erger ® 6% + 20% (w/v) Ca(NO$_3$)$_2$ | 20.94 | 3.769 | −0.70 | −0.2 |
| CPPU 300 ppm + Erger ® 10% + 20% (w/v) Ca(NO$_3$)$_2$ | 31.24 | 1.476 | 9.60 | 6.5 |
| CPPU 600 ppm + Erger ® 3% + 20% (w/v) Ca(NO$_3$)$_2$ | 25.45 | −0.535 | 3.81 | 9.1* |
| CPPU 600 ppm + Erger ® 10% + 20% (w/v) Ca(NO$_3$)$_2$ | 37.89 | 4.233 | 16.25 | 3.8 |
| CPPU 600 ppm + Erger ® 30% + 20% (w/v) Ca(NO$_3$)$_2$ | 28.39 | 1.952 | 6.75 | 3.5 |
| CPPU 1000 ppm + Erger ® 3% + 20% (w/v) Ca(NO$_3$)$_2$ | 31.53 | 9.789 | 9.89 | 1.0 |
| CPPU 1000 ppm + Erger ® 10% + 20% (w/v) Ca(NO$_3$)$_2$ | 33.18 | 14.067 | 11.54 | 0.8 |
| CPPU 1000 ppm + Erger ® 30% + 20% (w/v) Ca(NO$_3$)$_2$ | 30.50 | 12.021 | 8.86 | 0.7 |

*To calculate synergy negative expected values were normalized to positive values and the corresponding observed values were increased linearly.

At harvest (52 days after planting), the fresh weight was assessed. As can be seen in Tables 9 and 10, above, application of 1% HC was the standard for fresh weight, causing Concord grape vines to average 37.01 grams combined shoot fresh weight in the 17-0-0 fertilizer study and 42.21 grams combined shoot fresh weight in the 15-0-0 fertilizer study. None of the combinations of forchlorfenuron and fertilizer resulted in greater fresh weight than 1% HC. However, combinations of 600 ppm forchlorfenuron and 30% 17-0-0 fertilizer resulted in 33.68 grams combined fresh shoot weight and 600 ppm forchlorfenuron and 10% 15-0-0 fertilizer resulted in 37.89 grams combined fresh shoot weight. This data demonstrates that mixtures of forchlorfenuron and particular nitrogen containing fertilizers work as well as the industry leading HC at improving fresh weight.

The mixtures of forchlorfenuron and 15-0-0 or 17-0-0 fertilizers provided unexpected combined efficacy for several parameters. Both mixtures resulted in greater than expected fresh weight per plant, with OCE:ECE ratios greater than 1 for 11 out of 16 combinations. Thus, application of mixtures of the present invention lead to unexpected promotion of dormancy breaking that are similar to or better than commercial applications.

Example 3—Forchlorfenuron Mixtures Efficacy on Flame Seedless Grape Vines

Method

To assess the ability of mixtures of the invention to promote and synchronize bud break, these mixtures were applied to field-grown Flame seedless grape vines in Thermal, Calif., and examined for bud break (initiation of growth) and subsequent shoot development. Forchlorfenuron, Dormex (50% HC), 15-0-0 (Erger®) and 17-0-0 fertilizers (CAN17), and mixtures thereof were each applied individually or sequentially (co-applied) to the separate spurs of Flame seedless grape vines. Plants were evaluated for bud break at 41 days after treatment. Results of these evaluations can be seen below in Tables 11 and 12.

TABLE 11

Broken Buds per Spur 41 Days Post Application

|  | OCE | ECE | OCE:ECE |
|---|---|---|---|
| Control | 0.00 | — | — |
| 1% HC (v/v) | 1.48 | — | — |
| CPPU 300 ppm | 0.00 | — | — |
| CPPU 600 ppm | 0.03 | — | — |
| CPPU 1000 ppm | 0.00 | — | — |
| CAN17 10% (v/v) | 0.06 | — | — |
| CAN17 30% (v/v) | 0.24 | — | — |
| Erger ® 6% + Activ Erger ® | 0.13 | — | — |
| CPPU 600 ppm + CAN17 10% (v/v) | 0.52 | 0.09 | 5.8 |
| CPPU 1000 ppm + CAN17 10% (v/v) | 0.48 | 0.06 | 8.0 |
| CPPU 300 ppm + CAN17 30% (v/v) | 0.58 | 0.24 | 2.4 |
| CPPU 600 ppm + CAN17 30% (v/v) | 0.80 | 0.27 | 3.0 |
| CPPU 1000 ppm + CAN17 30% (v/v) | 1.32 | 0.24 | 5.5 |
| CPPU 300 ppm + Erger ® 6% + Activ Erger ® | 0.67 | 0.13 | 5.2 |
| CPPU 600 ppm + Erger ® 6% + Activ Erger ® | 0.64 | 0.16 | 4.0 |
| CPPU 1000 ppm + Erger ® 6% + Activ Erger ® | 0.99 | 0.13 | 7.6 |

As shown in Table 11, above, at 41 days post-application, the greatest number of broken buds per spur was achieved with 1% HC. Neither forchlorfenuron, nor the 17-0-0 or 15-0-0 fertilizers alone had caused large increases in buds/spur. However, the combinations of forchlorfenuron with fertilizers all showed a dose-dependent increase with both forchlorfenuron and fertilizer rates. Further, all combinations of forchlorfenuron and 17-0-0 fertilizer 10%, 17-0-0 fertilizer 30% or 15-0-0 fertilizer 6% resulted in greater than expected OCE:ECE ratios.

TABLE 12

Percentage of Spurs With At Least One Bud Broken 41 Days Post Application

|  | OCE | ECE | OCE:ECE |
|---|---|---|---|
| Control | 0 | — | — |
| 1% HC (v/v) | 72 | — | — |
| CPPU 300 ppm | 0 | — | — |
| CPPU 600 ppm | 3 | — | — |
| CPPU 1000 ppm | 0 | — | — |
| CAN17 10% (v/v) | 0 | — | — |
| CAN17 30% (v/v) | 10 | — | — |
| Erger ® 6% + Activ Erger ® | 4 | — | — |
| CPPU 600 ppm + CAN17 10% (v/v) | 45 | 3 | 15.0 |
| CPPU 1000 ppm + CAN17 10% (v/v) | 39 | 0 | 39.0 |
| CPPU 300 ppm + CAN17 30% (v/v) | 41 | 10 | 4.1 |
| CPPU 600 ppm + CAN17 30% (v/v) | 45 | 13 | 3.5 |
| CPPU 1000 ppm + CAN17 30% (v/v) | 76 | 10 | 7.6 |
| CPPU 300 ppm + Erger ® 6% + Activ Erger ® | 40 | 4 | 10.0 |

TABLE 12-continued

Percentage of Spurs With At Least One
Bud Broken 41 Days Post Application

|  | OCE | ECE | OCE:ECE |
|---|---|---|---|
| CPPU 600 ppm + Erger ® 6% + Activ Erger ® | 48 | 7 | 7.0 |
| CPPU 1000 ppm + Erger ® 6% + Activ Erger ® | 55 | 4 | 13.8 |

"ppm" denotes parts per million

The data in Table 12, above, shows the percentage of spurs with at least one broken bud. Given that the spur is the experimental unit, and each spur has an average of 2.35 buds, the percent bud break appears to be a good indicator of dormancy release. The treatment with the greatest percent of spurs with at least one broken bud was the combination of 1000 ppm forchlorfenuron with 30% CAN17. This was followed by 1% HC. As with the data presented in the previous table, the measure of spurs with at least one broken bud increases in a dose-dependent manner. Further, all combinations of forchlorfenuron and 17-0-0 fertilizer 10%, 17-0-0 fertilizer 30% or 15-0-0 fertilizer 6% resulted in greater than expected OCE:ECE ratios.

Example 4—Forchlorfenuron Mixtures Efficacy on *Malus*

Method

To assess the ability of mixtures of the invention to promote and synchronize bud break, these mixtures were applied to field-grown *Malus* (apple) rootstocks and examined for bud break (initiation of growth) and subsequent shoot development. Forchlorfenuron, Dormex (50% HC), 15-0-0 (Erger®) and 17-0-0 fertilizers (CAN17), and mixtures thereof were each applied individually or sequentially (co-applied) to the shoots of potted *Malus* rootstocks that were pruned to a height of 25 centimeters. Plants were evaluated for bud break at 28 days after treatment. Results of these evaluations can be seen below in Tables 13-17, below.

TABLE 13

Bud Break Synchrony

|  | 50% BB | 50% BB ECE | 50% BB OCE | 50% BB OCE:ECE |
|---|---|---|---|---|
| Control | 14 | — | — | — |
| 1% HC (v/v) | 12 | — | — | — |
| CPPU 300 ppm | 12 | — | 2 | — |
| CPPU 600 ppm | 12 | — | 2 | — |
| CAN17 30% (v/v) | 14 | — | 0 | — |
| Erger ® 6% + 20% (w/v) Ca(NO$_3$)$_2$ | 14 | — | 0 | — |
| CPPU 300 ppm + CAN17 30% | 12 | 2 | 2 | 1.0 |
| CPPU 600 ppm + CAN17 30% | 9 | 2 | 5 | 2.5 |
| CPPU 600 ppm + Erger ® 3% + 20% (w/v) Ca(NO$_3$)$_2$ | 12 | 2 | 2 | 1.0 |

As seen in Table 13, above, application of 1% HC was the standard for bud breaking, causing 50% of the *Malus* to break dormancy by 12 DAT. However, the combination of 600 ppm forchlorfenuron and 30% 17-0-0 fertilizer caused earlier bud break at 9 DAT. Further, 300 and 600 ppm forchlorfenuron and the combination of 300 ppm forchlorfenuron and 30% 17-0-0 fertilizer and 600 ppm forchlorfenuron and 6% 15-0-0 fertilizer caused the plants to reach 50% bud break in 12 DAT. Control plants took 14 days to reach 50% bud break. This data demonstrates that mixtures of forchlorfenuron and particular nitrogen containing fertilizers work better and as well as the industry standard HC at causing bud break.

The mixtures of forchlorfenuron and 17-0-0 fertilizers provided unexpected combined efficacy for several parameters. Specifically, a combination of 600 ppm forchlorfenuron and 30% 17-0-0 fertilizer provided an OCE:ECE ratio of 2.5. Thus, application of mixtures of the present invention lead to unexpected promotion of dormancy breaking that are similar to or better than commercial applications.

TABLE 14

Average Number of Broken Buds Per *Malus* Plant at Harvest

|  |  | ECE | OCE | OCE:ECE |
|---|---|---|---|---|
| Control | 6.13 | — | — | — |
| 1% HC (v/v) | 8.13 | — | — | — |
| CPPU 300 ppm | 7.00 | — | — | — |
| CPPU 600 ppm | 8.25 | — | — | — |
| CAN17 30% (v/v) | 4.50 | — | — | — |
| Erger ® 6% + 20% (w/v) Ca(NO$_3$)$_2$ | 5.00 | — | — | — |
| CPPU 300 ppm + CAN17 30% | 6.38 | −0.736 | 0.25 | 2.3* |
| CPPU 600 ppm + CAN17 30% | 6.88 | 0.535 | 0.75 | 1.4 |
| CPPU 600 ppm + Erger ® 3% + 20% (w/v) Ca(NO$_3$)$_2$ | 6.38 | 1.024 | 0.25 | 0.2 |

*To calculate synergy negative expected values were normalized to positive values and the corresponding observed values were increased linearly.

TABLE 15

Average Number of Broken Nodes Per Centimeter of Shoot at Harvest

|  |  | ECE | OCE | OCE:ECE |
|---|---|---|---|---|
| Control | 0.245 | — | — | — |
| 1% HC (v/v) | 0.325 | — | — | — |
| CPPU 300 ppm | 0.28 | — | — | — |
| CPPU 600 ppm | 0.33 | — | — | — |
| CAN17 30% (v/v) | 0.18 | — | — | — |
| Erger ® 6% + 20% (w/v) Ca(NO$_3$)$_2$ | 0.20 | — | — | — |
| CPPU 300 ppm + CAN17 30% | 0.26 | −0.030 | 0.01 | 1.1* |
| CPPU 600 ppm + CAN17 30% | 0.28 | 0.020 | 0.03 | 1.5 |
| CPPU 600 ppm + Erger ® 3% + 20% (w/v) Ca(NO$_3$)$_2$ | 0.26 | 0.040 | 0.01 | 0.2 |

*To calculate synergy negative expected values were normalized to positive values and the corresponding observed values were increased linearly.

At harvest (28 days after planting), the number of buds broken per plant and per centimeter of shoot was assessed. As can be seen in Tables 15 and 16, above, application of 1% HC was the standard for bud breaking, causing apples to average 8.13 broken buds per plant and 0.325 nodes per centimeter of shoot. However, 600 ppm forchlorfenuron caused a greater number of broken buds per plant and per centimeter of shoot than 1% HC. Control plants had 6.13 broken buds per plant and 0.245 broken buds per centimeter of shoot. This data demonstrates that mixtures of forchlorfenuron and particular nitrogen containing fertilizers work better and as well as the industry leading HC at causing bud break.

The mixtures of forchlorfenuron, 17-0-0 fertilizers provided unexpected combined efficacy for several parameters. Specifically, the combination of 300 ppm forchlorfenuron and 30% 17-0-0 fertilizer and 600 ppm forchlorfenuron and 30% 17-0-0 fertilizer provided an OCE:ECE ratio of 2.3 and 1.4, respectively, for nodes per shoot and 1.1 and 1.5, respectively, for nodes per centimeter of shoot. Thus, application of mixtures of the present invention lead to unexpected promotion of dormancy breaking that are similar to the commercial standard, Dormex.

TABLE 16

Fresh Weight at Harvest

|  | ECE | OCE | OCE:ECE |
| --- | --- | --- | --- |
| Control | 5.83 | — | — | — |
| 1% HC (v/v) | 7.99 | — | — | — |
| CPPU 300 ppm | 6.98 | — | — | — |
| CPPU 600 ppm | 5.65 | — | — | — |
| CAN17 30% (v/v) | 4.27 | — | — | — |
| Erger ® 6% + 20% (w/v) Ca(NO$_3$)$_2$ | 4.02 | — | — | — |
| CPPU 300 ppm + CAN17 30% | 5.60 | −0.397 | −0.23 | 1.4* |
| CPPU 600 ppm + CAN17 30% | 5.19 | −1.748 | −0.65 | 1.6* |
| CPPU 600 ppm + Erger ® 3% + 20% (w/v) Ca(NO$_3$)$_2$ | 4.17 | −2.001 | −1.67 | 1.2* |

*To calculate synergy negative expected values were normalized to positive values and the corresponding observed values were increased linearly.

TABLE 17

Fresh Weight per Bud at Harvest

|  | ECE | OCE | OCE:ECE |
| --- | --- | --- | --- |
| Control | 0.91 | — | — | — |
| 1% HC (v/v) | 0.98 | — | — | — |
| CPPU 300 ppm | 0.88 | — | — | — |
| CPPU 600 ppm | 0.71 | — | — | — |
| CAN17 30% (v/v) | 1.04 | — | — | — |
| Erger ® 6% + 20% (w/v) Ca(NO$_3$)$_2$ | 1.06 | — | — | — |
| CPPU 300 ppm + CAN17 30% | 0.85 | 0.093 | −0.07 | −0.7 |
| CPPU 600 ppm + CAN17 30% | 0.74 | −0.077 | −0.17 | 2.2 |
| CPPU 600 ppm + Erger ® 3% + 20% (w/v) Ca(NO$_3$)$_2$ | 0.54 | −0.059 | −0.37 | 6.2 |

* To calculate synergy negative expected values were normalized to positive values and the corresponding observed values were increased linearly.

At harvest (28 days after planting), the fresh weight and fresh weight per broken bud was assessed. As seen in Tables 16 and 17, above, application of 1% HC was the standard for fresh weight, causing *Malus* rootstocks to average 7.99 grams combined new shoot growth which equaled 0.98 combined shoot fresh weight per bud. None of the combinations of forchlorfenuron and fertilizer resulted in greater fresh weight or fresh weight per bud than 1% HC. However, both fertilizers resulted in greater fresh weight per bud. Further, combinations of 600 ppm forchlorfenuron and 30% 17-0-0 fertilizer resulted in 5.6 grams combined fresh shoot weight and 0.85 grams fresh weight per bud resulted. This data demonstrates that mixtures of forchlorfenuron and particular nitrogen containing fertilizers work as well as the industry leading HC at improving fresh weight.

The mixtures of forchlorfenuron, 15-0-0 and 17-0-0 fertilizers provided unexpected combined efficacy for several parameters. Both mixtures resulted in greater than expected fresh weight per plant and per bud, with OCE:ECE ratios greater than 1 for 5 out of 6 combinations. Thus, application of mixtures of the present invention lead to unexpected promotion of dormancy breaking that are similar to or better than commercial applications.

Example 5—Forchlorfenuron Mixtures Efficacy on *Prunus*

Method

To assess the ability of mixtures of the invention to promote and synchronize bud break, these mixtures were applied to *Prunus* (stone fruit) plants in the greenhouse and examined for bud break (initiation of growth) and subsequent shoot development. Forchlorfenuron, Dormex (50% HC), 15-0-0 (Erger®) and 17-0-0 fertilizers (CAN17), and mixtures thereof were each applied individually or sequentially (co-applied) to the shoots of *Prunus* plants. Plants were evaluated for bud break at 28 days after treatment. Results of these evaluations can be seen below in Tables 18 and 19, below.

TABLE 18

Bud Break Synchrony

|  | 50% BB | 50% BB ECE | 50% BB OCE | 50% BB OCE:ECE |
| --- | --- | --- | --- | --- |
| Control | 14 | — | — | — |
| 1% HC (v/v) | 7 | — | — | — |
| CPPU 300 ppm | 14 | — | — | — |
| CPPU 600 ppm | 10 | — | — | — |
| CAN17 30% (v/v) | 5 | — | — | — |
| Erger ® 6% + 20% (w/v) Ca(NO$_3$)$_2$ | 10 | — | — | — |
| CPPU 300 ppm + CAN17 30% | 7 | 9 | 7 | 0.8 |
| CPPU 600 ppm + CAN17 30% | 5 | 13 | 9 | 0.7 |
| CPPU 600 ppm + Erger ® 3% + 20% (w/v) Ca(NO$_3$)$_2$ | 7 | 8 | 7 | 0.9 |

As seen in Table 18, above, application of 1% HC was the standard for bud breaking, causing *Prunus* to reach 50% bud break by 7 DAT. However, 30% 17-0-0 fertilizer and the combination of 600 ppm forchlorfenuron and 30% 17-0-0 fertilizer caused earlier bud break at 5 DAT. Further, the combination of 300 ppm forchlorfenuron and 30% 17-0-0 fertilizer and 600 ppm forchlorfenuron and 6% 15-0-0 fertilizer caused the plants to reach 50% bud break in 7 DAT. Control plants took 14 days to reach 50% bud break. This data demonstrates that mixtures of forchlorfenuron and nitrogen containing fertilizers work better and as well as the industry standard HC at causing bud break.

TABLE 19

Fresh Weight at Harvest

|  | FW (grams) | ECE | OCE | OCE:ECE |
| --- | --- | --- | --- | --- |
| Control | 3.92 | — | — | — |
| 1% HC (v/v) | 4.76 | — | — | — |
| CPPU 300 ppm | 1.34 | — | — | — |

TABLE 19-continued

Fresh Weight at Harvest

| | FW (grams) | ECE | OCE | OCE:ECE |
|---|---|---|---|---|
| CPPU 600 ppm | 4.91 | — | — | — |
| CAN17 30% (v/v) | 6.11 | — | — | — |
| Erger® 6% + 20% (w/v) Ca(NO$_3$)$_2$ | 4.30 | — | — | — |
| CPPU 300 ppm + CAN17 30% | 7.97 | −0.336 | 4.05 | 14* |
| CPPU 600 ppm + CAN17 30% | 4.45 | 3.161 | 0.53 | 0.2 |
| CPPU 600 ppm + Erger® 3% + 20% (w/v) Ca(NO$_3$)$_2$ | 3.51 | 1.366 | −0.42 | −0.3 |

*To calculate synergy negative expected values were normalized to positive values and the corresponding observed values were increased linearly.
FW denotes fresh weight At harvest (28 days after planting), the fresh weight of new growth was assessed. As can be seen in Tables 18 and 19, above, application of 1% HC was the standard for fresh weight, causing *Prunus* to average 4.76 grams combined new shoot fresh weight. Combinations of 300 ppm forchlorfenuron and 17-0-0 fertilizer resulted in greater fresh weight than 1% HC. This data demonstrates that mixtures of forchlorfenuron and particular nitrogen containing fertilizers work as well as the industry leading HC at improving fresh weight.

The mixtures of forchlorfenuron and 17-0-0 fertilizers provided unexpected combined efficacy for several parameters. Specifically, 300 ppm forchlorfenuron and 30% 17-0-0 fertilizer resulted in fresh weight per plant with OCE:ECE ratio of 14. Thus, application of mixtures of the present invention lead to unexpected promotion of dormancy breaking that are similar to or better than commercial applications.

What is claimed is:

1. A method of promoting bud break in flame seedless grapes consisting of applying a liquid composition comprising as the only active ingredient a mixture of an effective amount of forchlorfenuron and an effective amount of a calcium ammonium nitrate liquid fertilizer consisting of 0% phosphorus, 0% potassium and either about 15% or about 17% nitrogen to the flame seedless grapes, wherein the amount of forchlorfenuron and the calcium ammonium nitrate liquid fertilizer is at a ratio from about 1:43 to about 1:428 when the calcium ammonium nitrate liquid fertilizer contains about 17% nitrogen and wherein the amount of forchlorfenuron and calcium ammonium nitrate liquid fertilizer is at a ratio from about 1:66 to about 1:220 when the calcium ammonium nitrate liquid fertilizer contains about 15% nitrogen.

2. The method of claim 1, wherein forchlorfenuron and the calcium ammonium nitrate liquid fertilizer are applied sequentially or concurrently.

* * * * *